(12) United States Patent
Mazza et al.

(10) Patent No.: US 12,417,259 B2
(45) Date of Patent: Sep. 16, 2025

(54) SYSTEM AND METHOD FOR FINETUNING AUTOMATED SENTIMENT ANALYSIS

(71) Applicant: GENESYS CLOUD SERVICES, INC., Daly City, CA (US)

(72) Inventors: Arnon Mazza, Tel-Aviv (IL); Lev Haikin, Tel-Aviv (IL); Eyal Orbach, Tel-Aviv (IL); Avraham Faizakof, Tel-Aviv (IL)

(73) Assignee: Genesys Cloud Services, Inc., Daly City, CA (US)

( * ) Notice: Subject to any disclaimer, the term of this patent is extended or adjusted under 35 U.S.C. 154(b) by 1087 days.

(21) Appl. No.: 17/318,467

(22) Filed: May 12, 2021

(65) Prior Publication Data

US 2022/0366197 A1    Nov. 17, 2022

(51) Int. Cl.
*G06N 20/00* (2019.01)
*G06F 18/21* (2023.01)
(Continued)

(52) U.S. Cl.
CPC ........ *G06F 18/241* (2023.01); *G06F 18/2113* (2023.01); *G06F 18/217* (2023.01);
(Continued)

(58) Field of Classification Search
CPC .. G06F 18/2113; G06F 18/217; G06F 18/241; G06F 18/2431; G06F 18/40; G06F 40/30; G06N 20/20; G06N 20/00
See application file for complete search history.

(56) References Cited

U.S. PATENT DOCUMENTS

| 2015/0170053 A1* | 6/2015 | Miao | G06N 20/00 706/12 |
| 2016/0125751 A1* | 5/2016 | Barker | G16H 40/20 434/322 |

(Continued)

FOREIGN PATENT DOCUMENTS

WO    2013170344 A1    11/2013

OTHER PUBLICATIONS

PCT International Search Report and Written Opinion regarding co-pending PCT application No. PCT/US2021/031991 mailed on Feb. 7, 2022.

*Primary Examiner* — Paulinho E Smith
(74) *Attorney, Agent, or Firm* — Taft Stettinius & Hollister LLP (57) ABSTRACT

A method and system for finetuning automated sentiment classification by at least one processor may include: receiving a first machine learning (ML) model $M_0$, pretrained to perform automated sentiment classification of utterances, based on a first annotated training dataset; associating one or more instances of model $M_0$ to one or more corresponding sites; and for one or more (e.g., each) ML model $M_0$ instance and/or site: receiving at least one utterance via the corresponding site; obtaining at least one data element of annotated feedback, corresponding to the at least one utterance; retraining the ML model $M_0$, to produce a second ML model $M_1$, based on a second annotated training dataset, wherein the second annotated training dataset may include the first annotated training dataset and the at least one annotated feedback data element; and using the second ML model $M_1$, to classify utterances according to one or more sentiment classes.

16 Claims, 5 Drawing Sheets

S2005: Receiving a ML model M0, pretrained to perform automated sentiment classification of utterances, wherein model M0 is associated with at least one prediction threshold.

S2010: associating one or more instances of model M0 to one or more corresponding sites.

For at least one (e.g., each) ML model M0 instance

S2015: Receiving at least one utterance via the corresponding site.

S2020: Obtaining at least one data element of annotated feedback, corresponding to the at least one utterance.

S2025: Automatically calibrating the at least one prediction threshold according to a required level of precision, and based on the at least one annotated feedback data element.

S2030: Using the at least one prediction threshold to classify utterances as belonging to one or more sentiment classes.

(51) Int. Cl.
*G06F 18/2113* (2023.01)
*G06F 18/241* (2023.01)
*G06F 18/2431* (2023.01)
*G06F 18/40* (2023.01)
*G06N 20/20* (2019.01)

(52) U.S. Cl.
CPC .......... *G06F 18/2431* (2023.01); *G06F 18/40* (2023.01); *G06N 20/20* (2019.01)

(56) References Cited

U.S. PATENT DOCUMENTS

| | | |
|---|---|---|
| 2016/0189037 A1 | 6/2016 | Pereg et al. |
| 2016/0350651 A1* | 12/2016 | Devarajan ............... G06F 40/30 |
| 2018/0261211 A1 | 9/2018 | Dolan et al. |
| 2018/0268298 A1* | 9/2018 | Johansen ............... G06V 10/82 |
| 2021/0209488 A1* | 7/2021 | Li ......................... G06N 3/063 |

\* cited by examiner

| Negative class confidence score 122 | Human annotation (e.g., feedback 145) | Aggregate corrects | Prefix size (e.g., index) | Calculated precision (p_calc) of prefix list |
|---|---|---|---|---|
| 0.996884876 | 1 | 1 | 1 | 1.00 |
| 0.976367836 | 1 | 2 | 2 | 1.00 |
| 0.965539707 | 1 | 3 | 3 | 1.00 |
| 0.962116544 | 1 | 4 | 4 | 1.00 |
| 0.961038317 | 0 | 4 | 5 | 0.80 |
| 0.959273718 | 1 | 5 | 6 | 0.83 |
| 0.954959055 | 1 | 6 | 7 | 0.85 |
| 0.945034598 | 1 | 7 | 8 | 0.87 |
| 0.94471059 | 1 | 8 | 9 | 0.89 |
| 0.942005353 | 0 | 8 | 10 | 0.80 |
| 0.937766031 | 1 | 9 | 11 | 0.82 |
| 0.911744024 | 1 | 10 | 12 | 0.83 |
| 0.905689805 | 1 | 11 | 13 | 0.85 |
| 0.902707252 | 1 | 12 | 14 | 0.86 |
| 0.896962053 | 0 | 12 | 15 | 0.80 |
| 0.896371917 | 1 | 13 | 16 | 0.81 |
| 0.895903877 | 0 | 13 | 17 | 0.76 |
| 0.895784767 | 0 | 13 | 18 | 0.72 |
| 0.892032422 | 1 | 14 | 19 | 0.73 |

Prediction threshold value 151B

SYSTEM AND METHOD FOR FINETUNING AUTOMATED SENTIMENT ANALYSIS

FIELD OF THE INVENTION

The present invention relates generally to the field of automated natural language processing. More specifically, the present invention relates to finetuning automated sentiment classification.

BACKGROUND OF THE INVENTION

Sentiment analysis is the task of detecting sentiments in written text or verbal utterances, including for example, sentiments such as happiness, anger, surprise, and sarcasm. Currently available methods for performing sentiment analysis may include, for example, training a machine learning (ML) model to differentiate sentimental sentences from neutral sentences. For an input sentence, such a ML model may return a sentiment class and a score which may reflect its confidence level in the prediction.

One commercial aspect of employing sentiment analysis may be found in the domain of contact centers. In this domain, sentiment analysis is mainly used for detecting sentiments that are expressed by customers during their interactions with a company's agent. Such interactions can take the form of chats, emails, social media, voice calls and the like. In the latter case, the term sentiment analysis may refer to analysis of text that is generated from the voice call by an automated speech recognition engine.

Naturally, any sentiment classification model may produce incorrect predictions, which can be either total and objective, or subjective per the perception of the call center analyst. Inherent difficulties in deployment of sentiment analysis models or systems may arise when the system encounters a new domain, which was not included in the training material, and meets new vocabulary or words that may have a specific meaning in the new domain.

SUMMARY OF THE INVENTION

Embodiments of the invention may address this challenge, by implementing an interactive process, by which users may be allowed to provide feedback on predictions made by the application, and thus affect its future predictions. Embodiments of the invention may leverage this feedback in a plurality of ways.

For example, utterances with corrected output sentiment may be used to retrain or finetune the model, with the aim of generalizing the model to similar utterances in the relevant domains and businesses. The terms "retrain" and "finetune" may be used herein interchangeably, in the sense of improving a training of the model, as elaborated herein.

In another example, by analyzing a random sample of predictions versus truth values, embodiments of the invention may learn to optimally tune prediction thresholds for sentiment classification for each instantiation or installation of the present invention.

Embodiments of the invention may include a method of finetuning automated sentiment classification by at least one processor. Embodiments of the method may include receiving a first machine learning (ML) model $M_0$, pretrained to perform automated sentiment classification of utterances, based on a first annotated training dataset; and associating one or more instances of model $M_0$ to one or more corresponding sites. For each ML model $M_0$ instance, embodiments may further include receiving at least one utterance via the corresponding site; obtaining at least one data element of annotated feedback, corresponding to the at least one utterance; retraining the ML model $M_0$, to produce a second ML model $M_1$, based on a second annotated training dataset, wherein the second annotated training dataset may include the first annotated training dataset and the at least one annotated feedback data element; and using the second ML model $M_1$, to classify utterances according to one or more sentiment classes.

According to some embodiments of the invention, the at least one processor may obtain the at least one data element of annotated feedback interactively, via a user interface (UI) associated with the corresponding site. The annotated feedback may include, for example, classification of the at least one utterance according to zero or more sentiment classes.

Embodiments of the invention may include receiving an annotated validation dataset, that may include a plurality of utterances, and computing a corresponding plurality of confidence scores. For example, each confidence score may represent a certainty level of classification of an utterance to a sentiment class. Embodiments of the invention may sort the utterances of the validation dataset in an ordered list, according to the computed confidence scores;

Embodiments of the invention may include computing, for one or more entries of the ordered list, a value of classification precision; identifying an index of the ordered list that corresponds to a required classification precision value; and determining the confidence score of the identified index as a prediction threshold for classifying utterances as belonging to the sentiment class.

Embodiments of the invention may include a method of finetuning automated sentiment classification by at least one processor. Embodiments of the method may include receiving a ML model $M_0$, pretrained to perform automated sentiment classification of utterances, wherein model $M_0$ may be associated with at least one prediction threshold; and associating one or more instances of model $M_0$ to one or more corresponding sites.

For at least one (e.g., each) ML model $M_0$ instance and/or site, embodiments of the invention may receive at least one utterance via the corresponding site; obtain at least one data element of annotated feedback, corresponding to the at least one utterance; automatically calibrate the at least one prediction threshold according to a required level of precision, and based on the at least one annotated feedback data element; and use the at least one prediction threshold to classify utterances as belonging to one or more sentiment classes.

According to some embodiments of the invention, obtaining the at least one data element of annotated feedback may include: presenting one or more utterances to a user, via a UI; and obtaining the annotated feedback data element from the user via the UI, wherein the annotated feedback may include classification of the presented one or more utterances according to zero or more sentiment classes.

According to some embodiments of the invention, presenting one or more utterances may include: calculating a plurality of confidence scores to a corresponding plurality of utterances, according to each utterance's pertinence to a sentiment class; selecting a subset of utterances of the plurality of utterances for feedback based on their respective confidence scores; and presenting the selected subset of utterances via the UI.

According to some embodiments of the invention, selecting one or more utterances for feedback may include, for each sentiment class: selecting a first subset of utterances that surpass a selection threshold from the plurality of utterances; and randomly selecting a second subset of utterances from the first subset; and presenting the second subset of utterances via the UI.

According to some embodiments of the invention the prediction threshold may be specific for each sentiment class.

According to some embodiments of the invention the size of the second subset of utterances may be limited by a predefined subset size, that may be specific for each sentiment class. In some embodiments the second subset of utterances may include, or may be limited to 300 utterances or less.

According to some embodiments of the invention, calibrating the at least one prediction threshold may include: calculating one or more confidence scores, corresponding to the one or more utterances of the second subset, according to each utterance's pertinence to a sentiment class; sorting the plurality of utterances of the second subset in a descending ordered list, according to the confidence scores; for one or more entries of the ordered list, computing a value of classification precision based on the annotated feedback; identifying an index of the ordered list that corresponds to a required classification precision value; and determining the confidence score of the identified index as the value of the prediction threshold.

In some embodiments, the predefined subset size may be selected so as to guarantee that the prediction threshold corresponds to ground truth precision having a predefined confidence value (e.g., at least 95%) within a predefined margin of error (e.g., 0.05).

According to some embodiments, the sentiment classes may include, for example a positive sentiment class, a negative sentiment class and a neutral sentiment class.

Embodiments of the invention may include a system for finetuning automated sentiment analysis. Embodiments of the system may be associated with a specific site and may include: (a) a non-transitory memory device storing instruction code, and (b) at least one processor associated with the memory device.

According to some embodiments, the at least one processor may be configured to execute the instruction code so as to: receive a first ML model $M_0$, pretrained to perform automated sentiment classification of utterances, based on a first annotated training dataset; receive at least one utterance via the site; obtain at least one data element of annotated feedback, corresponding to the at least one utterance; retrain the ML model $M_0$, to produce a second ML model $M_1$, based on a second annotated training dataset, wherein the second annotated training dataset may include the first annotated training dataset and the at least one annotated feedback data element; and use the second ML model $M_1$ to classify utterances according to one or more sentiment classes.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

Figure 1:
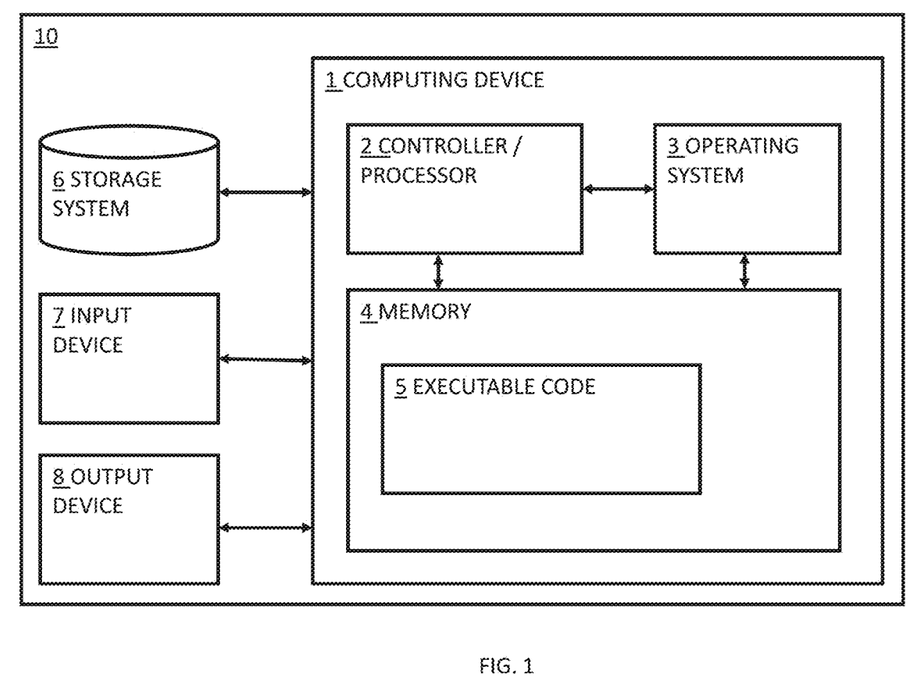
FIG. 1 is a block diagram, depicting a computing device which may be included in a system for finetuning automated sentiment classification, according to some embodiments.

Reference is now made to FIG. 1, which is a block diagram depicting a computing device, which may be included within an embodiment of a system for finetuning automated sentiment classification, according to some embodiments.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long-term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task, or script. Executable code 5 may be executed by processor or controller 2 possibly under control of operating system 3. For example, executable code 5 may be an application that may finetune automated sentiment classification as further described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to verbal and/or textual utterance may be stored in storage system 6 and may be loaded from storage system 6 into memory 4 where it may be processed by processor or controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components, or systems, e.g., a detachable keyboard or keypad, a mouse, and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

A neural network (NN) or artificial neural network (ANN), such as a neural network implementing a machine learning (ML) or artificial intelligence (AI) function may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g., CPUs or graphics processing units (GPUs), or a dedicated hardware device may perform the relevant calculations.

Figure 2:
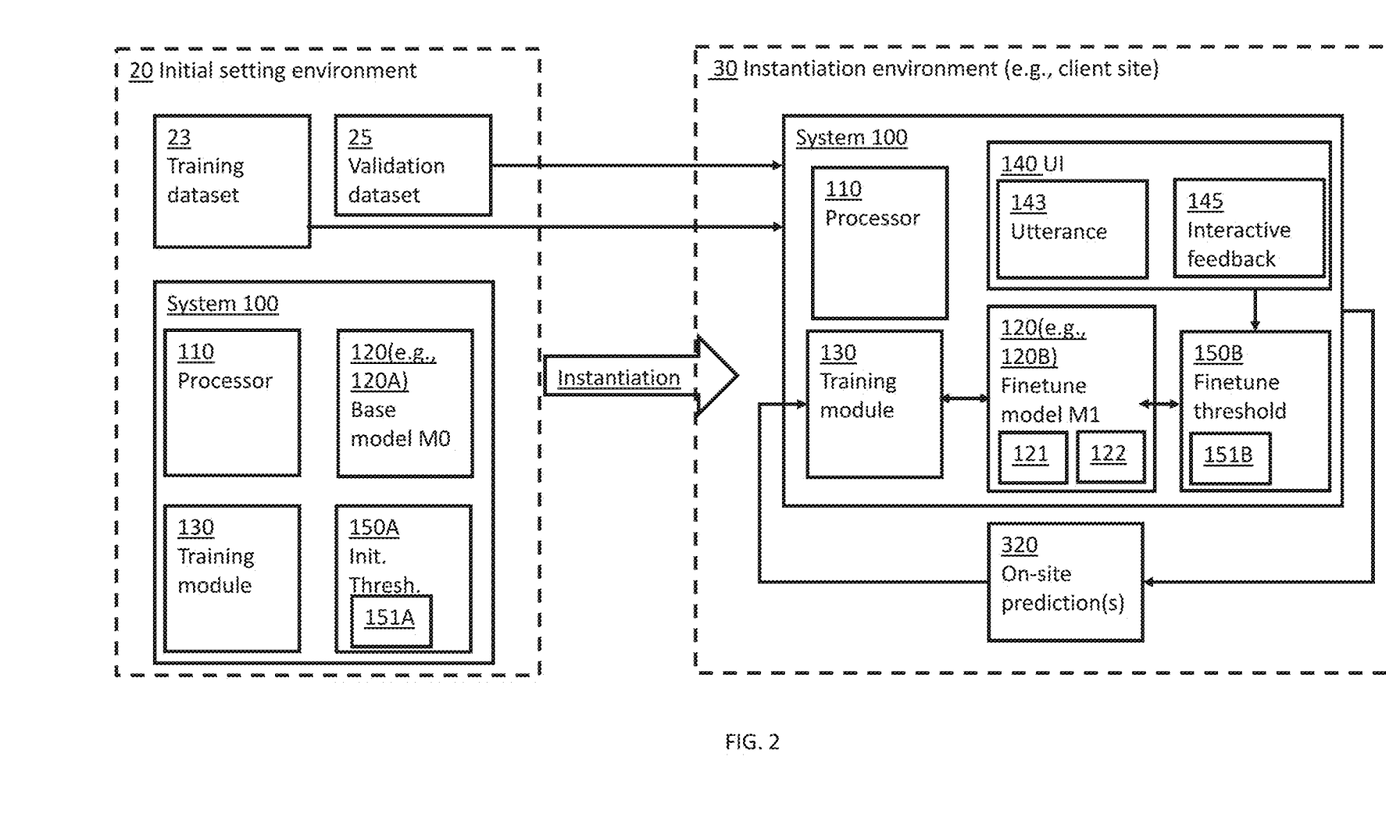
FIG. 2 is a block diagram, depicting a system for finetuning automated sentiment classification, according to some embodiments.

Reference is now made to FIG. 2, which depicts a system 100 for finetuning automated sentiment classification, according to some embodiments.

According to some embodiments of the invention, system 100 may be implemented as a software module, a hardware module, or any combination thereof. For example, system 100 may be, or may include a computing device such as element 1 of FIG. 1, and may be adapted to execute one or more modules of executable code (e.g., element 5 of FIG. 1) to finetune automated sentiment classification, as further described herein.

According to some embodiments, and as shown in FIG. 2, system 100 may include or may receive a machine-learning (ML) based model 120 (e.g., 120A, 120B). ML model 120 may be initially trained, or pretrained, in an initial setting or environment 20, to perform automated sentiment classification of utterances, using a first annotated dataset. The term "utterance" may be used in this context to refer to a verbal, or vocal utterance that may include one or more syllables or words. Additionally, or alternatively, the term "utterance" may be used in this context to refer to a textual data element that may represent one or more uttered syllables or words, and may have been obtained via a speech-to-text conversion, as known in the art.

As depicted in FIG. 2, the initial, or pretrained model may be denoted herein as a "base model", $M_0$, and/or ML model 120, and these notations may be used herein interchangeably.

The first annotated dataset may be, or may include for example an annotated or labeled training dataset, denoted as element 23 in FIG. 2. Additionally, or alternatively, the first annotated dataset may be, or may include a validation dataset denoted as element 25 in FIG. 2.

According to some embodiments, initial setting, or environment 20 may refer herein to an environment that may not necessarily be associated with a specific client environment. For example, initial setting, or environment 20 may pertain to a vendor or distributor of system 100, and may be disconnected, or offline, in relation to any specific client environment. In a complementary manner, the term client site or instantiation environment 30 may be used herein to refer to a site or a computing environment that may pertain to a specific installation or instantiation of system 100 on one or more computing devices (e.g., computing device 10 of FIG. 1), that are related to a client site.

As illustrated by the thick arrow of FIG. 2, after the initial training of system 100 in the initial setting or environment 20, system 100 may be installed, or deployed on one or more computing devices 10 that may be related to a client site, including for example an organizational computing network, one or more computers hosting a website associated with a specific client or organization, and the like. It may thus be said that one or more installations or instantiations of system 100, including one or more respective instances of model $M_0$ may be associated to one or more corresponding instantiation environments or client sites 30 (e.g., websites, computing networks, etc.).

According to some embodiments, for one or more (e.g., each) instance of ML model $M_0$ (e.g., pertaining to each client site 30), system 100 may receive at least one utterance 143 via the corresponding client site 30.

For example, client site 30 may be or may include a chat room of a specific client or organization, a website associated with a client or organization, a contact center of the client or organization, and the like. Accordingly, received utterance 143 may be a vocal utterance, a verbal utterance, a textual element representing a verbal utterance, etc. that has been received (e.g., via phone, chat, etc.) at client site 30.

In one non-limiting example, system 100 may be installed or deployed in a client site 30 as part of a client site as a Contact Center Analytics application. As elaborated herein, system 100 may be adapted to enable users of the Contact Center Analytics application to affect the process of sentiment content detection by providing interactive feedback to the application on its predictions through a user interface 140. The interactive feedback may facilitate a local, independent finetuning or retraining of ML model 120, in a sense that it may be associated with a specific client site 30 (e.g., a specific contact center site or Cloud tenant). For example, the finetuning or retraining of ML model 120 may adapt the sentiment analysis model 120 to a jargon that may be used in an organization's domain and/or business. According to some embodiments, users may be able to fix unsatisfactory predictions of ML model 120, and/or strengthen correct predictions.

As elaborated herein, system 100 may use interactive feedback to classification of utterances to: (a) retrain or finetune ML model 120, and (b) finetune one or more prediction thresholds, to yield a desired target precision.

According to some embodiments, system 100 may include a user interface (UI) 140, that may correspond to, or facilitate an interface to client site 30. For example, UI 140 may be an application (e.g., a webpage) that may facilitate an interface to a client website 30. Additionally, or Alternatively, UI 140 may be or may include a chat application, that may facilitate a client site chat room 30. Additionally, or Alternatively, UI 140 may be or may include an application that may facilitate a call center, between representatives of an organization and customers of that organization.

According to some embodiments, system 100 may receive, e.g., via UI 140, one or data elements that include unseen data such as unseen utterances 143. System 100 may perform one or more on-site predictions on the unseen utterances data elements 143. In other words, system 100 may utilize instantiation 120B of pretrained model $M_0$ to classify or predict (as commonly referred to in the art) a class at least one received utterance 143.

The predicted classes may be, or may include for example at least one first class of positive utterances, such as utterances in which a customer expresses content with a service provided by the client site (e.g., "thanks a lot, I appreciate your helpfulness"). In a complementary manner, the predicted classes may include at least one a second class of negative utterances such as utterances in which a customer expresses discontent with a service provided by the client site (e.g., "I have been waiting for a very long time").

According to some embodiments, system 100 may receive or obtain, e.g., from a user via UI 140, at least one feedback data element 145. Feedback data element 145 may be an annotated feedback data element, corresponding to the at least one utterance 143 and/or to a corresponding on-site prediction. In other words, the at least one data element of annotated feedback may be obtained interactively, via a user interface (UI) associated with the corresponding client site 30, as elaborated herein.

For example, UI 140 may present to a user (e.g., via output device 8 of FIG. 1, such as a screen) at least one utterance 143 and a corresponding on-site prediction 320 made by model 120. The user may disagree with on-site prediction 320. For example, the user may determine that system 100 has erroneously classified the utterance 143 as a negative sentiment, where in fact it was positive or neutral, and vice versa. The user may subsequently choose to input (e.g., via input device 7 of FIG. 1) an interactive feedback data element 145, to correct this error. For example, the user may include, in the annotated feedback, classification of the at least one utterance according to zero, one or more sentiment classes, such as a "positive sentiment" class 121, a "negative sentiment" class 121 and a neutral class 121.

The term "interactive" may be used herein in a sense that system 100 may present, and/or query the validity of on-site prediction 320, in relation to utterance 143 via UI 140, and may subsequently receive feedback data element 145 from a user, via UI 140, in response to the presentation or query.

In some embodiment, e.g., where the sentiment classes 121 include a "positive sentiment" class and a "negative sentiment" class, feedback 145 may include, for each class 121 (e.g., "positive sentiment" and "negative sentiment"), one or more feedback types, including for example a false positive (FP) feedback type, a false negative (FN) feedback type, a true positive (TP) feedback type, and a true negative (TN) feedback type.

For example, a false-positive (FP) feedback type may relate to either a negative or positive sentiment class, and may be denoted herein as FP/NEG and FP/POS, respectively. For example, if an utterance 145 such as "the weather today is awful" was erroneously classified 121 by model 120 as conveying a negative sentiment, a user may provide annotating interactive feedback 145 such as FP (e.g., FP/NEG). Alternatively, if an utterance such as "thanks, goodbye" was erroneously classified 121 by model 120 as conveying a positive sentiment, a user may provide annotating interactive feedback 145 such as FP (e.g., FP/POS).

In another example, a false-negative (FN) feedback type may relate to either a negative or positive sentiment class, and may be denoted herein as FN/NEG and FN/POS, respectively. For example, the utterance or sentence 143 "if you don't solve my problems, I am gonna switch to Netflix" may be annotated by interactive feedback 145 as FN (e.g., FN/NEG) if it was not classified 121 by model 120 as conveying a negative sentiment. Alternatively, an utterance 143 such as the sentence "thanks, I really appreciate it" may be marked by the user as FN (FN/POS) if it was not classified 121 by model 120 as conveying a positive sentiment.

In another example, true-positive (TP) annotation and true-negative (TN) annotations may be provided as interactive feedback 145 to support a prediction made by model 120, for either one of the sentiment classes (e.g., negative, positive, or neutral).

According to some embodiments, system 100 may include a training module 130, adapted to retrain or finetune ML model 120 (e.g., $M_0$), so as to produce a second ML model, or a second version of ML model 120. This finetuned model is denoted in FIG. 2 as model $M_1$, or element 120B.

According to some embodiments, training module 130 may retrain or finetune ML model 120 based on an annotated training dataset, that may include the first annotated training dataset (e.g., training dataset 23 and/or validation dataset 25), as well as the at least one interactive, annotated feedback data element 145.

According to some embodiments, the sentiment classes may represent a sentiment, and may include for example, a positive sentiment class, a negative sentiment class, a neutral sentiment class, etc. System 100 may utilize the fine-tuned or retrained ML model $M_1$, to classify incoming utterances 143 according to one or more sentiment classes (e.g., positive sentiment, negative sentiment, neutral, etc.). Additionally, or alternatively, system 100 may utilize training module 130 to continuously train or fine-tune ML model $M_1$ 120B. The term "continuously" may be used in this context in a sense that training module 130 may repeatedly or periodically retrain ML model $M_1$ as elaborated herein, following for example ingress of one or more interactive feedback data elements 145, and the like.

It may be appreciated by a person skilled in the art that that finetuned model $M_1$ may be a product of three factors: (a) interactive feedback 145, (b) base model $M_0$ (e.g., denoted 120A) and (c) the original dataset (e.g., training dataset 23 and/or validation dataset 25). According to some embodiments, training module 130 may retrain or finetune ML model 120 based on (a) and on one or more of (b) and (c).

It may be appreciated that input for any finetuning process may include feedback data. However, a model that is fine-tuned based solely on feedback will tend to forget parts of the original training material. Therefore, the original training data or parts of it are often added to the finetuning training set.

According to some embodiments, training module 130 may include at least part (e.g., all) of the original training dataset (e.g., training dataset 23 and/or validation dataset 25) as input for the finetuning process. For example, training dataset 23 and/or validation dataset 25 may be stored on a cloud-based storage server, to facilitate training of local (e.g., pertaining to client site 30) instantiations of system 100.

According to some embodiments, portions of data used for training may be weighted, so as to assign prominence to any specific portion. For example, interactive user feedback data 145 may be weighted or duplicated during the process of retraining or finetuning of model 120, to give extra importance to user feedback 145. Experimental results have shown that 5 to 10-fold duplication of user feedback 145 for retraining model 120 may provide optimal performance.

According to some embodiments, training module 130 may commence the finetuning process of model 120 from the already trained, on-site model (e.g., $M_0$ or $M_1$) 120 rather than "from scratch" (e.g., using random weights). Experimental results have shown that this manner of training may produce results that are stable throughout the finetuning process, as interactive feedback data 145 is continuously input. In contrast, training of model 120 from scratch may tend to converge into different local optima in different runs, resulting in more fluctuations in scores of utterances that are not related to feedback data 145. Training module 130 may measure this stability by the mean change of F1 in subsequent finetuning invocations, each time increasing the number of feedback 145 data instances by a few more samples. Training module 130 may use a small learning rate (e.g., in the order of $3^{e-5}$), which may, for example, be 3 to 30 times smaller than the learning rate that was used to train base model $M_0$.

Table 1 below includes examples of feedback utterances that were used to finetune a base model $M_0$ (e.g., so as to produce finetuned model $M_1$) as well as variants of these utterances, on which finetuned model $M_1$ succeeded to make accurate predictions, but the base model $M_0$ failed. Predictions of Table 1 are considered binary, in a sense that they may either be correct or incorrect, with respect to a prediction threshold that attains precision of 80% on the validation set for the respective model (e.g., $M_0$ and $M_1$). In the examples of Table 1, the finetuned model $M_1$ was able to nicely generalize classification 121 of utterances 143 (e.g., sentences) that have similar meaning to the original utterances but are not exactly the same.

TABLE 1

| Feedback type | Feedback utterance | Similar utterance |
|---|---|---|
| FN/NEG | kinda tried to cheat me you know | they actually tried to cheat me |
| FN/NEG | we've been pulling our hair out trying to figure this out ever since | i have been pulling my hair out trying to understand this |
| FP/NEG | we didn't know if it was part of the you know the outage that's been going on i guess | a power outage has been going on i guess |
| FP/NEG | i feel such pain for him | i feel so much pain for them |

An important decision in any ML-based classification process is how to predict a class (e.g., produce a class prediction) from a raw output vector of the classifier. This process may require computing a set of prediction thresholds, which is commonly referred to as a working point. The working point may be determined by finding the prediction threshold values that yield a required precision value, p_req, over a validation dataset 25. The precision may be calculated, for each class, as the number of correct predictions divided by the number of positive predictions, as elaborated in equation Eq. 1, below:

$$\text{Precision}=TP/(TP+FP) \qquad \text{Eq. 1:}$$

where TP is the true-positive ratio of the relevant class, and

FP is the false-positive ratio of the relevant class.

For example, for each class (e.g., a negative sentiment class) a calculated precision value, p_calc, at prediction threshold 0.8 may be the number of correct predictions (e.g., predictions of negative sentiment) with confidence>=0.8, divided by the total number of predictions (e.g., correct, and incorrect predictions of negative sentiment) with confidence>=0.8.

The problem with this approach may be that validation set 25 may not necessarily represent data (e.g., utterance data elements 143) on client site 30. Therefore, the actual, calculated precision value p_calc may be lower or higher than required precision p_req.

If the actual, calculated precision p_calc of a specific class is lower than p_req (e.g., beyond a predefined margin value), then it may be desired to increase p_calc so as to reduce the number of incorrect predictions of system 100, and avoid having too many erroneous predictions being highly ranked by system 100, as elaborated herein.

In a complementary manner, if p_calc of a specific class is higher than p_req (e.g., beyond a predefined margin value) then it may be desired to decrease the prediction threshold of the relevant class, in order to increase the recall of the class, and obtain more high-quality classifications. As known in the art a recall value of a class may be calculated according to equation Eq. 2, below:

$$\text{Recall}=TP/(TP+FN), \qquad \text{EQ. 2:}$$

where TP is the true-positive ratio of the relevant class, and

FN is the false-negative ratio of the relevant class.

According to some embodiments, ML model 120 may be configured to receive an input utterance 143, and produce (or predict, as commonly referred to in the art) a sentiment class 121 and a corresponding confidence score 122. Confidence score 122 may represent a level of confidence, or certainty of classification of the relevant utterance to a sentiment class. Confidence score 122 may be or may include a numerical value, e.g., between 0 and 1, where a low value (e.g., 0.1) represents low confidence of classification 121, and a high value (e.g., 0.9) represents high confidence of classification.

In some embodiment, e.g., where the sentiment classes 121 include a "positive sentiment" class and a "negative sentiment" class, the majority of predictions may be neutral, e.g., neither pertaining to a positive sentiment nor to a negative sentiment. Therefore, a practical challenge in such embodiments may be to detect polar (e.g., negative, or positive) utterances.

To this end, initial prediction threshold module 150A may set an initial working point by finding two prediction thresholds 151A, one for the negative class and one for the positive class, that yield a required level of precision (e.g., p_req=0.8) on validation set 25. However, as discussed herein, this approach may not guarantee the required precision in view of unseen utterance data on client site 30. To address this problem, system 100 may include a finetuning threshold module 150B, adapted to compute prediction thresholds 151B based on client site 30 specific data utterances 143 and corresponding confidence scores 122, as elaborated herein.

According to some embodiments of the invention, system 100 may exploit an insight that the calculated precision, p_calc, may only depend on utterances 143 that surpass prediction threshold 151B. Therefore, finetuning threshold module 150B may suffice in sampling a relatively small random subset of utterances 143 from the overall number of incoming utterances 143, which have high polar confidence scores 122. For this subset, system 100 may actively prompt (e.g., via UI 140) a user for feedback. The feedback may, for example be in a form of a correct/incorrect selection, to confirm or refute a classification of a relevant utterance 143. As elaborated herein, finetuning threshold module 150B may then look for prediction thresholds 151B (e.g., for negative/positive sentiment classes) that will produce the required precision p_req on this sample. As the sampling is performed in random, the actual, calculated precision value p_calc for the client site 30 utterance data 143 may be guaranteed to lie within an arbitrarily narrow confidence interval from the target precision p_req. The higher the sample size, the smaller the margin of error may be.

It may be appreciated by a person skilled in the art of statistics, and has been experimentally demonstrated by embodiments of the invention, that a subset of sampled utterances 143 that may be as narrow as 250 samples (per each polar class) may ensure a 95% confidence interval with a margin of error that may be smaller than 0.05. In other words, embodiments of the invention may perform an intelligent selection of a very narrow subset of samples of utterance data 143 for interactive feedback 145, and thus require minimal effort of human input, while maintaining a high confidence interval, with a small margin of error.

As elaborated herein, finetuning threshold module 150B may perform client site 30-specific tuning of prediction thresholds 151B, based on random sampling of utterances 143 with high polar scores. The computation of different prediction thresholds 151B (e.g., negative sentiment threshold and positive sentiment threshold) may be performed similarly, and independently.

According to some embodiments, finetuning threshold module 150B may be adapted to determine a prediction threshold value TH (denoted in FIG. 2 as element 151B), that may induce a predefined confidence interval which is likely to contain a required target precision value p_req, with a predefined margin of error. For example, finetuning threshold module 150B may aim to find a 95% confidence interval around p_req=0.8, with a margin of error e<0.05. It may be appreciated by a person skilled in the art of statistics, and has been shown that such an interval may be guaranteed if the interactive feedback 145 includes at least 250 random samples, taken from the range of confidence scores [TH,1].

However, since the exact prediction threshold TH 151B value may not be known in advance, and as it may theoretically lie in the range [0.5,1], acquiring 250 samples in the critical range [TH,1] may require drawing many irrelevant samples from the range [0.5,TH]. For example, if the confidence scores of predictions of model 120 are uniformly distributed in the range of [0.5,1], and if prediction threshold TH=0.75 yields the target precision p_req, then finetuning threshold module 150B may require 500 samples to compute the value of prediction threshold TH 151B, even though only 250 of them serve to estimate the precision above prediction threshold TH 151B. As every sample may require feedback 145 from a user, via UI 140, it may be desirable to minimize the number of samples needed beyond the minimum of 250 that are required to guarantee the confidence interval.

As elaborated herein, (e.g., in relation to FIG. 2), system 100 may include or may receive a ML model 120, pretrained to perform automated sentiment classification of utterances 143. ML model 120 may be associated with at least one initial prediction threshold 151 (e.g., 151A).

According to some embodiments, one or more instances of ML model 120 may be instantiated or associated with to one or more corresponding client sites 30. For each ML model 120 instance (and each corresponding client site 30), system 100 may receive at least one utterance 143 via the corresponding site, obtaining at least one data element of interactive annotated feedback 145, corresponding to the at least one utterance 143.

As elaborated herein, for each ML model 120 instance, system 100 may subsequently automatically calibrate the at least one prediction threshold 151 (e.g., 151A) to obtain a calibrated, or fine-tuned prediction threshold 151B, according to a required level of precision p_req, and based on the at least one annotated feedback data element.

ML model 120 may then utilize the at least one fine-tuned prediction threshold 151 (e.g., 151B) to classify utterances 143 as belonging to one or more sentiment classes 121.

For example, if ML model 120 predicts a classification 121 (e.g., "positive sentiment") of a specific utterance 143, and the corresponding confidence score 122 exceed the prediction threshold 151B for that class, then system 100 may determine that the relevant utterance is indeed classified as predicted by ML model 120 (e.g., "positive sentiment"). In a complementary manner, if the corresponding confidence score 122 does not exceed the prediction threshold 151B for that class, then system 100 may determine that the relevant utterance is not classified as predicted by ML model 120 (e.g., "neutral sentiment").

Figure 3:
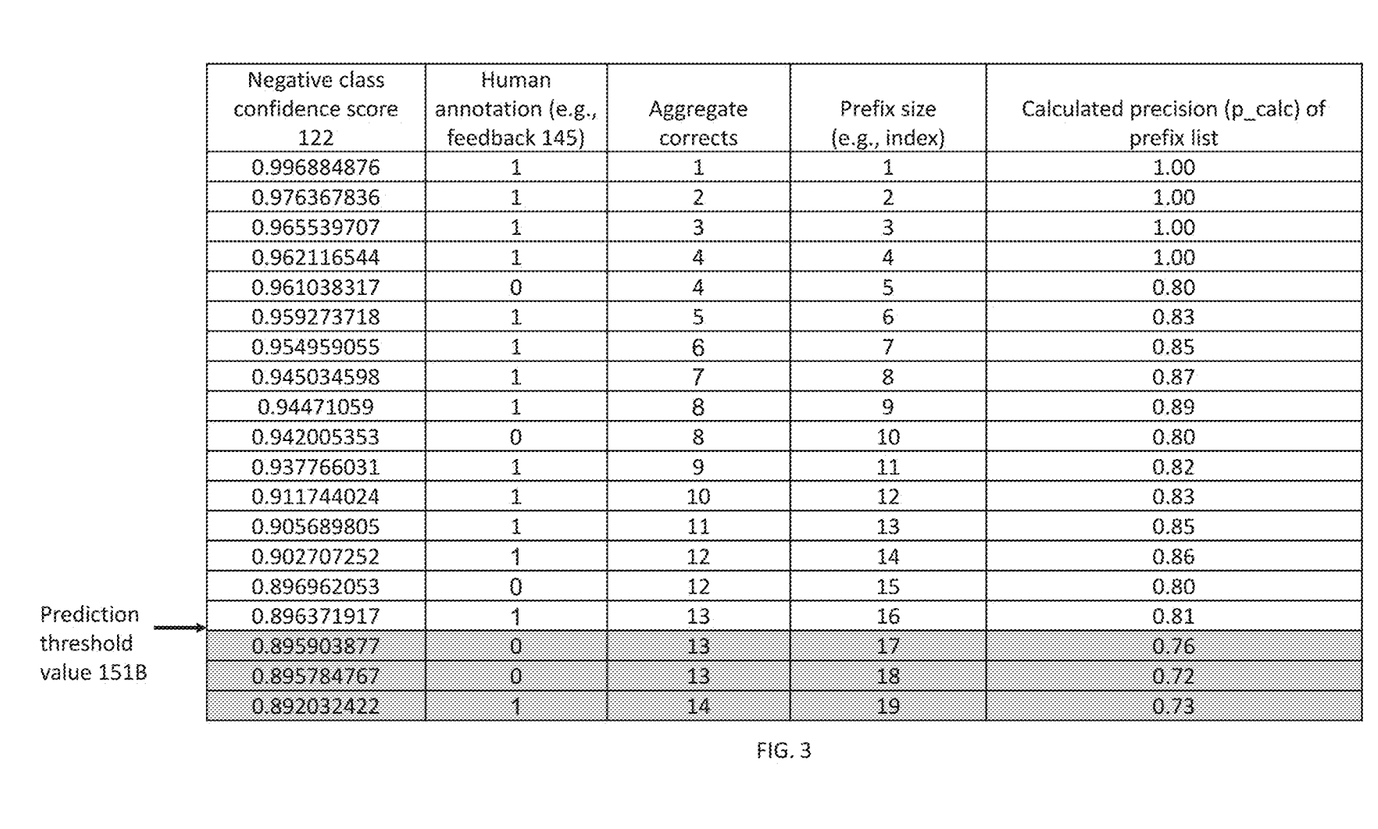
FIG. 3 is a table, depicting an example of data that may be used to determine a prediction threshold, according to some embodiments.

Reference is now made to FIG. 3 which is a table, depicting an example of data that may be used to determine a prediction threshold 151B, according to some embodiments of the invention. It may be appreciated that the data depicted in FIG. 3 may represent a simplified algorithm for automatic calibration of the at least one prediction threshold 151B. A more elaborated version of the automatic prediction threshold algorithm is also provided herein.

As elaborated herein (e.g., in relation to FIG. 2), system 100 may present to a user e.g., via UI 140 one or more utterances 143 and a corresponding on-site predictions 320 made by model 120 (e.g., model $M_0$ or $M_1$). For example, an utterance may be verbal or textual utterance of a negative sentence, such as: "I am not pleased with the service", and the on-site prediction 320 made by model 120 may include an indication of a "negative sentiment" classification.

According to some embodiments, model 120 may calculate a plurality of confidence scores 122, corresponding to a plurality of utterances 143, according to each utterance's pertinence to a sentiment class. For example, as shown in the left-most column in the example of FIG. 3, model 120 may calculate negative (e.g., negative sentiment) class confidence scores, as a floating number in the range of [0, 1], where high values (e.g., 0.9) represent a negative sentiment classification with high confidence and low values (e.g., 0.1) represent a negative sentiment classification with low confidence.

According to some embodiments, processor 110 may select a subset of utterances 143 of the plurality of utterances 143, to be presented on UI 140 for feedback, based on their respective confidence scores 122. UI 140 may subsequently present the selected subset of utterances 143 and obtain feedback therefrom. For example, as shown in the "Human annotation" column of the example of FIG. 3, a human user may provide this feedback as a yes or no (denoted 0/1) annotation, indicating whether they agree (e.g., '1') or disagree (e.g., '0') to the classification.

According to some embodiments, processor 110 may select the subset of utterances 143 for feedback by: (a) selecting a first subset of utterances which have a confidence score 122 that surpasses a selection threshold (e.g., 0.5) from the plurality of utterances; and (b) randomly selecting a second subset of utterances from the first subset.

As explained herein, as the selection of utterances for feedback is performed randomly, the actual precision value for the client site 30 utterance data 143 may be guaranteed to lie within a narrow confidence interval from computed precision p_calc. As elaborated herein, embodiments of the invention may fine-tune the precision of classification prediction to converge to a required precision, denoted p_req. Therefore, the actual precision value for the client site 30 utterance data 143 may be guaranteed to lie within a narrow confidence interval from requested precision p_req. In addition, as the sample size (e.g., the number of utterances in the second subset) increases, the smaller the margin of error may be.

According to some embodiments, the selection threshold may be set to a different or specific value for each class. For example, for a first (e.g., "negative sentiment") class a first selection threshold value may be used, whereas for a second (e.g., "positive sentiment") class a second, different selection threshold value may be used.

As shown in FIG. 3, finetuning threshold module 150B may sort the plurality of utterances 143 of the second subset in a descending ordered list, according to the confidence scores 122 (e.g., the "Negative class confidence score" of the leftmost column). Finetuning threshold module 150B may then compute, for one or more (e.g., all) entries of the ordered list, a value of classification precision based on the annotated feedback.

For example, starting from the top-most confidence scores 122, finetuning threshold module 150B may aggregate the number of "correct" (e.g., '1') human annotations (e.g., as shown in the "Aggregate corrects" column), and divide them by the ad-hoc number of utterances (e.g., as shown in the "Prefix size" column). Thus, for example, the calculated precision after four utterances is 4/4=1.0, whereas the calculated precision after five utterances is ⅘=0.8.

According to some embodiments, finetuning threshold module 150B may identify an index of the ordered list that corresponds to a required classification precision value. For example, a required classification precision value may be 0.8, and finetuning threshold module 150B may identify the first index of an utterance, for which the calculated precision has fallen beneath the required classification precision value. In the example of FIG. 3 this is the $17^{th}$ utterance, for which the calculated precision has fallen to 0.76, e.g., beneath the predefined threshold of 0.8. The utterances for which the calculated precision is below the predefined threshold are marked in gray in the example of FIG. 3.

According to some embodiments, finetuning threshold module 150B may calibrate, or finetune prediction threshold 151B according to the identified index.

For example, finetuning threshold module 150B may determine the calibrated, or fine-tuned prediction threshold 151B to be equal to the confidence score 122 corresponding to the identified index. In the example of FIG. 3, this value is 0.895903877. Alternatively, finetuning threshold module 150B may determine the fine-tuned prediction threshold 151B to be equal to the confidence score 122 corresponding to the index just above the identified index. In the example of FIG. 3, this value is 0.896371917. Alternatively, finetuning threshold module 150B may determine the fine-tuned prediction threshold 151B to be a function (e.g., an average) between two or more class confidence scores 122 (e.g., AVG(0.896371917, 0.895903877)=0.896137897). Other specific manners of determining fine-tuned prediction threshold 151B based on the confidence scores 122 of the sorted list may also be possible.

It may be appreciated that the calibration or fine-tuning of fine-tuned prediction threshold 151B may be implemented or performed independently for each class.

Additionally, or alternatively, the prediction threshold 151B may be specific for each sentiment class.

For example, a first prediction threshold value 151B may be used to classify utterances 143 as pertaining to a "positive sentiment" class, and a second, different prediction threshold value 151B may be used to classify utterances 143 as pertaining to a "negative sentiment" class.

According to some embodiments, the size of the second subset, e.g., the number of utterances that are selected to be presented for feedback (e.g., presented for human annotation) may be selected so as to guarantee that the prediction threshold will correspond to ground truth precision having a predefined confidence value, within a predefined margin of error. For example, the size of the second subset may be selected so as to guarantee that the prediction precision will be in 95% confidence within a margin of error of 0.05 from the ground truth precision.

According to some embodiments of the invention, the size of the second subset of utterances (e.g., utterances randomly selected for feedback) may be limited by a predefined subset limit size value, which may be specific for each sentiment class. In other words, system 100 may randomly select a first number of utterances for feedback for a first (e.g., "positive sentiment") class, and randomly select a second, different number of utterances for feedback for a second (e.g., "negative sentiment") class.

According to some embodiments the second subset of utterances may include 300 utterances or less. In other words, the subset limit size value for one or more (e.g., all) classes may be 300 or less. It has been experimentally demonstrated that such a small number of 300 utterances or less may be adequate to a required precision value of p_req=0.8, at a 95% confidence interval around p_req=0.8, with a margin of error e<0.05, for a commercial-size dataset of utterances.

Additionally, or alternatively, embodiments of the invention may calibrate the at least one prediction threshold 151 (e.g., 151A) to obtain a calibrated, or fine-tuned prediction threshold 151B, according to a required level of precision p_req, based on an annotated validation dataset 25.

In such embodiments, system 100 may receive an annotated validation dataset 25 that may include a plurality of utterances. Annotated validation dataset 25 may be annotated in a sense that it may include ground-truth classification or labeling of one or more (e.g., all) utterances included therein. Model 120 (e.g., $M_0$ or $M_1$) may compute a plurality of confidence scores 122, corresponding to the plurality of utterances of annotated validation dataset 25, where each confidence score 122 represents a certainty level of classification of an utterance to a sentiment class (e.g., a "negative sentiment" class). Finetune threshold module 150B may subsequently sort the utterances of annotated validation dataset 25 in an ordered list, according to the computed confidence scores 122, as depicted in the example of FIG. 3. For one or more entries of the ordered list, finetune threshold module 150B may compute a value of classification precision, and identify an index of the ordered list that corresponds to a required classification precision value, in a similar manner as elaborated above. Finetune threshold module 150B may subsequently determine the confidence score 122 of the identified index as a prediction threshold 151B for classifying utterances as belonging to the relevant sentiment class, in a similar manner as that described above.

Additionally, or alternatively, finetune threshold module 150B may calibrate a prediction threshold 151B of at least one class (e.g., a "negative sentiment class") according to an alternative algorithm, as elaborated below.

Finetune threshold module 150B may receive, as input: (a) a target or requested precision value p_req (e.g., 0.8), (b) a minimal sample size MS (e.g., 250), (c) an extra number of samples eps (e.g., 30), which may be used to verify that below the returned prediction threshold 151B the precision indeed falls below p_req, (d) a confidence interval probability C (e.g., 95%), and (e) a margin of error e (e.g., 0.05).

The term "sample" may be used herein to refer to one or more utterances which may be selected by embodiments of the invention to be presented to a user, for obtaining supervisory feedback on classification (e.g., True Positive (TP), True Negative (TN), False Positive (FP) and False Negative (FN)), as elaborated herein.

According to some embodiment, finetune threshold module 150B may employ a three-phase analysis algorithm to determine, produce or emit, based on this input, a prediction threshold value 151B for at least one class (e.g., "negative sentiment" class or "positive sentiment" class) that achieves a precision of p_req (or as close as possible to p_req) on a random sample of at least MS samples, above prediction threshold 151B and that guarantees a C confidence interval with margin of error e around p_req for the entire population, as elaborated herein.

According to some embodiments, finetune threshold module 150B may initially collect all utterances with a confidence score 122 that exceeds a predefined selection threshold, sort them by decreasing scores (e.g., as presented in FIG. 3) and divide them to a predefined number n_bins of bins of equal size, denoted $b_1 \ldots, b_{n\_bins}$, where $b_1$ is the highest scoring bin, and $b_{n\_bins}$ (e.g., $b_{10}$) is the lowest scoring bin. For example, the number of all utterances that have a confidence score 122 that exceeds a predefined selection threshold (e.g., >0.5) may be 600,000. Finetune threshold module 150B may divide these utterances to 10 bins (e.g., $b_1 \ldots, b_{10}$) of 60,000 utterances each, where $b_1$ is the highest scoring bin, and $b_{10}$ is the lowest scoring bin.

In a first phase, denoted herein as "phase 1", finetune threshold module 150B may perform initial estimation of the bin index where the desired prediction threshold value 151B may be located. In this phase, T may indicate a current bin index, and 's' may indicate an initial sample size per bin (e.g., 30 samples per each bin).

During phase 1, and starting from the first bin (e.g., T initialized to '1'), finetune threshold module 150B may repeat steps 1a, 1b and 1c below, for each bin, until a stop condition is met, as elaborated below:

Phase 1
{
1a. Compute the precision p_calc of all samples (e.g., from all bins) taken so far.
1b. If p_calc>=p_req, then sample s (e.g., 30) utterances from the next "unused" bin, $b_i$, and increment i (e.g., i=i+1).

The stop condition may be, for example: (a) the ad-hoc calculated precision (e.g., calculated as explained in relation to the example of FIG. 3) p_calc is smaller than the required p_req precision; and (b) the number of samples n_samp exceeds a minimal value, as elaborated in equation 3, below:

$$p\_calc<p\_req;$$

$$size(n\_samp)>=MS+eps; \qquad \text{Eq. 3}$$

For example, assuming that (p_calc<p_req) occurs on the sixth bin (e.g., i=6), and that s=30, then n_samp=6*30=180<MS=250. After adding a first batch of 10 samples for each used bin: n_samp=6*(30+10)=240<MS=250, and the stop condition is not yet met. After adding a second batch of 10 samples for each used bin: n_samp=6*(30+10+10)=300>MS=250, and the stop condition is met.

In a second phase, denoted herein as "phase 2", finetune threshold module 150B may find the exact prediction threshold 151B value, where the calculated precision falls below p_req.

In this phase, finetune threshold module 150B may repeat steps 2a through 2d, as elaborated below:
Phase 2
{
2a. Finetune threshold module 150B may sort the n_samp (e.g., 300 in the current example) acquired samples in decreasing order of confidence scores 122.
2b. For every prefix of the ordered set, finetune threshold module 150B may compute its precision p_calc, as elaborated herein (e.g., in relation to FIG. 3).
2c. Finetune threshold module 150B may determine an index j, which is the maximal index corresponding to a precision value p_calc>=p_req. Finetune threshold module 150B may denote the precision of the corresponding prefix by p(j).

In a third phase, denoted herein as "phase 3", finetune threshold module 150B may perform a process denoted herein as "tail analysis", configured to determine that a drop in precision below index j is statistically likely to represent a trend rather than a local drop or 'glitch', as elaborated below. Finetune threshold module 150B may repeat step 3a through 3d, until the required threshold 151B is found at step 3d:
Phase 3
{
3a. If the tail size, defined as a difference between the number of samples (e.g., n_samp, in this example 300) and the predefined minimal number of samples (e.g., MS, in this example 250) is less than a predefine number (e.g., 20, in this example 300−250=50>20), then finetune threshold module 150B may go back to step 1a (e.g., sample s utterances from the next "unused" bin, bi, and increment i (i=i+1).
3b. Let k be the number of true predictions in the tail (e.g., the last 300−250=50 samples). Finetune threshold module 150B may compute the p-value, for at most k successes out of n_samp−j trials, assuming binomial distribution with success probability p_req. This p-value may represent the null hypothesis that the precision in the tail area is p_req or higher, and is computed using the binomial cumulative distribution function (CDF).
3c. If the p-value is greater than 0.05 (accept the null hypothesis) then finetune threshold module 150B may draw s samples from a new bin $b_j$ and, and finetune threshold module 150B may go back to step 2a. The motivation for this step may be that since the null hypothesis was accepted (e.g., a drop in the calculated precision p_calc was detected as a false alarm) finetune threshold module 150B may draw a minimal, additional number of samples from a new bin, and realcalute the point where p_calc goes below p_req. 3d. If the p-value is <=0.05 (reject the null hypothesis) then finetune threshold module 150B may return prediction threshold value 151B as the score of the sample at index j.
56

It may be appreciated that upon termination, the C=95% confidence interval is [p_calc−e, p_calc+e], where: e (e.g., the margin of error) may be calculated according to equation Eq. 4, below:

$$e = Z0.95 \times \sqrt{p\_calc(1-p\_calc)/n\_samp} \qquad \text{Eq. 4}$$

where Z0.95 is the z-score at 0.95.

Taking as an example a required level of precision p_req=0.8, and since p_calc is expected to be very close to p_req, Eq. 4 may produce:

$$e \sim 1.96 \times \sqrt{0.8 \times 0.2/250} = 0.049,$$

which means that given a target precision of 0.8, and sample size of 300, the probability of the actual precision of the entire population to be contained within the range [0.751, 0.849] is at least 0.95.

Figure 4:
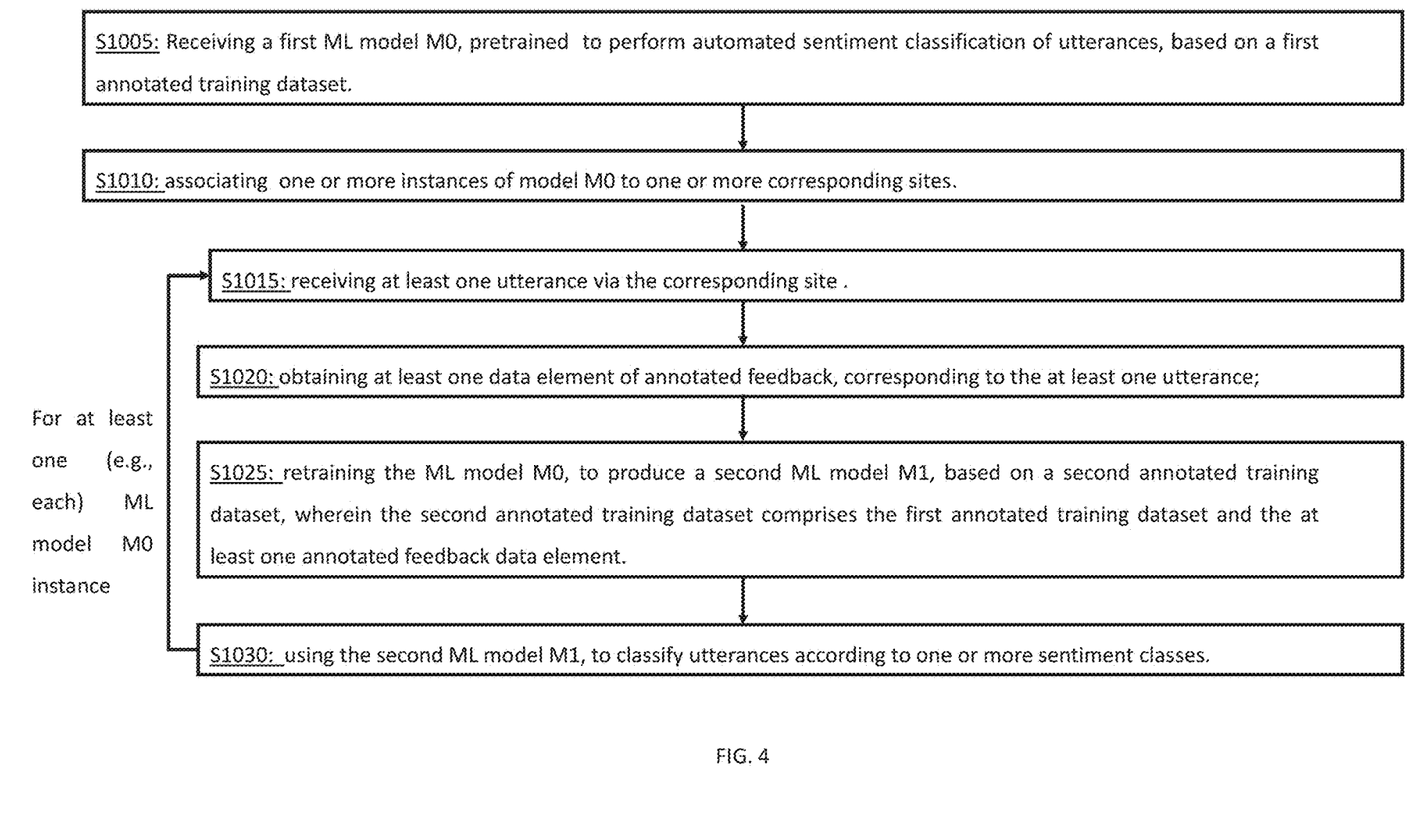
FIG. 4 is a flow diagram, depicting a method of finetuning automated sentiment classification by at least one processor, according to some embodiments.

Reference is now made to FIG. 4 is a flow diagram, depicting a method of finetuning automated sentiment classification by at least one processor (e.g., processor 2 of FIG. 1), according to some embodiments of the invention.

As shown in step S1005, the at least one processor may receive a first ML model $M_0$ (e.g., ML model 120A of FIG. 2). First ML model $M_0$ may be initially trained, or pretrained to perform automated sentiment classification of utterances, based on a first annotated training dataset 23 and/or validation set 25.

As shown in step S1010, the at least one processor may associate one or more instances of model $M_0$ with, or deploy one or more instances of model $M_0$, at one or more corresponding sites. These one or more sites may include, for example, a website, a call center, an online chat room, and the like, that may belong to, or be associated with one or more corresponding organizations, clients and/or companies. It may be appreciated that pretraining the first ML model $M_0$ according to annotated training dataset 23 and/or validation set 25 may be performed at a site of a vendor of ML model $M_0$, and may be done before deployment or association of ML model $M_0$ to the one or more sites.

As shown in step S1015, for at least one (e.g., each) ML model $M_0$ instance, the at least one processor may receive at least one utterance 143 via the corresponding site. For example, the at least one utterance may be a vocal or verbal utterance, received from a customer via a phone call with a site that is a call center. In another example, the at least one utterance may be a textual utterance, received from a customer via site that is an online chat, or an organizational web page, and the like.

As shown in step S1020, for at least one (e.g., each) ML model $M_0$ instance, the at least one processor may obtain at least one data element of annotated feedback 145, corresponding to the at least one utterance. For example, the at least one data element of annotated feedback 145 may include a labeling or annotation relating to sentimental classification of the at least one utterance 143. For example, annotated feedback 145 may include supervisory feedback regarding classification of at least one utterance 143 by ML model 120A, such as a True Positive (TP) annotation, a True Negative (TN) annotation, a False Positive (FP) annotation and a False Negative (FN) annotation. Additionally, or alternatively, at least one data element of annotated feedback 145 may include labeled or annotated data such as "ground-truth" sentiment classification (e.g., "positive sentiment", "negative sentiment") of the at least one utterance 143.

As shown in step S1025, for at least one (e.g., each) ML model $M_0$ instance 120A, the at least one processor may retrain, or fine-tune training of ML model $M_0$, to produce a second ML model $M_1$ (e.g., ML model 120B of FIG. 2). Retraining of ML model 120A may be based on a second annotated training dataset, wherein the second annotated training dataset may include the first annotated training dataset 23 and the at least one annotated feedback data element 145.

As shown in step S1030, for at least one (e.g., each) site (e.g., and/or corresponding ML model $M_0$ instance 120A), the at least one processor may use the second ML model $M_1$ 120B to classify utterances, e.g., utterances 143 received at the associated site, according to one or more sentiment classes (e.g., according to a "positive sentiment" class, a "neutral sentiment" class, and a "negative sentiment" class).

Figure 5:
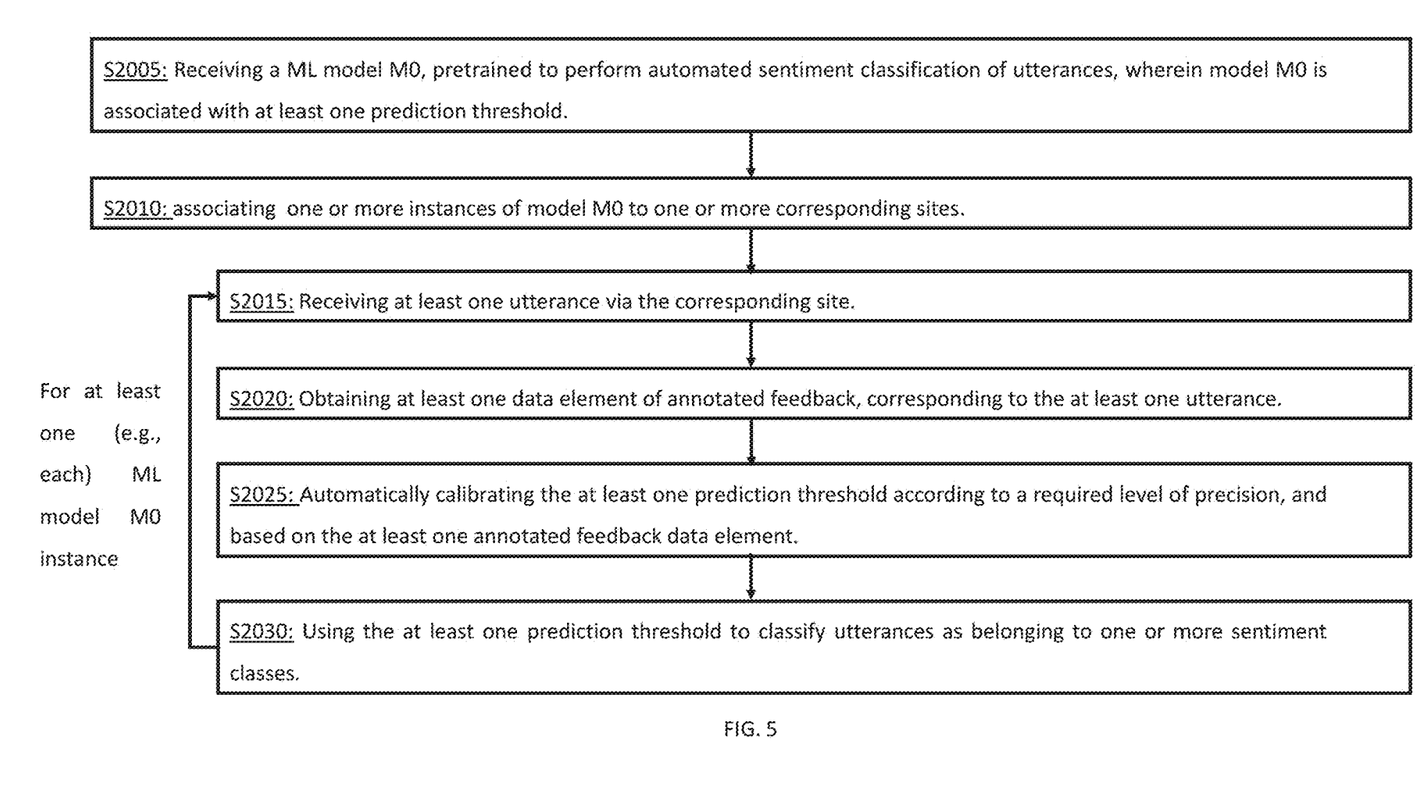
FIG. 5 is a flow diagram, depicting another method of finetuning automated sentiment classification by at least one processor, according to some embodiments.

Reference is now made to FIG. 5 which is a flow diagram, depicting another method of finetuning automated sentiment classification by at least one processor (e.g., processor 2 of FIG. 1), according to some embodiments of the invention.

As shown in step S2005, the at least one processor may receive a first ML model $M_0$ (e.g., ML model 120A of FIG. 2). First ML model $M_0$ may be initially trained, or pretrained to perform automated sentiment classification of utterances, based on a first annotated training dataset 23 and/or validation set 25. Additionally, or alternatively, ML model $M_0$ may be associated with at least one prediction threshold (e.g., initial threshold 151A of FIG. 2).

As shown in step S2010, the at least one processor may associate one or more instances of model $M_0$ with, or deploy one or more instances of model $M_0$ at one or more corresponding sites. These one or more sites may include, for example, a website, a call center, an online chat room, and the like, that may belong to, or be associated with one or more corresponding organizations, clients and/or companies, as elaborated herein.

As shown in step S2015, for at least one (e.g., each) ML model $M_0$ instance 120A, the at least one processor may receive at least one utterance via the corresponding site, as elaborated herein (e.g., in relation to FIG. 4).

As shown in step S2020, for at least one (e.g., each) ML model $M_0$ instance, the at least one processor may obtain at least one data element of annotated feedback 145, corresponding to the at least one utterance, as elaborated herein (e.g., in relation to FIG. 4).

As shown in step S2025, for at least one (e.g., each) ML model $M_0$ instance, the at least one processor may automatically calibrate the at least one prediction threshold 151B according to a required level of precision (e.g., denoted herein as p_req), and based on the at least one annotated feedback data element 145, as elaborated herein (e.g., in relation to FIG. 3).

As shown in step S2030, for at least one (e.g., each) site, the at least one processor may use the at least one prediction threshold to classify utterances 143 as belonging to one or more sentiment classes, as elaborated herein.

Embodiments of the invention may include a practical application for performing ML-based natural language processing.

Embodiments of the invention may include several improvements over currently available technology of ML-based classification, and especially ML-based natural language processing, and sentiment analysis.

For example, embodiments of the invention may improve ML-based sentiment analysis technology by refining or retraining a pretrained sentiment analysis ML model, according to specific environment, jargon and/or field of a specific site or organization at which the ML model is deployed. This retraining may be based on, or consider: (a) an initial training dataset upon which the ML model was initially pretrained, and (b) supervisory feedback data, pertaining to the specific site at which the ML model is deployed.

In another example, embodiments of the invention may improve ML-based sentiment analysis technology by receiving a required level of precision (denoted herein as p_req), intelligently selecting a minimal, and yet sufficient number of utterances as samples for receiving human feedback, based on p_req and automatically fine-tuning a prediction threshold of a prediction layer of the ML model, based on this minimal number of samples.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of finetuning automated sentiment classification by a computing system to handle new vocabularies introduced by domains of new deployments, the method comprising:

receiving a base machine learning (ML) model $M_0$, pretrained to perform automated sentiment classification of utterances, based on a first annotated training dataset;

deploying a respective instance of the base ML model $M_0$ to each of one or more respective instantiation environments;

for each deployed ML model $M_0$ instance:
receiving at least one respective utterance via a contact center application of the respective instantiation environment;
obtaining at least one respective data element of annotated feedback, wherein the at least one respective data element of annotated feedback corresponds to the at least one respective utterance and to a respective prediction, determined by the deployed ML model $M_0$ instance, of a sentiment class of the at least one respective utterance and includes a user determined classification of the at least one respective utterance and a corresponding feedback type;

retraining the deployed ML model $M_0$ instance to produce a second respective ML model $M_1$ based on a second respective annotated training dataset that comprises the first annotated training dataset and the at least one respective data element of annotated feedback, wherein the at least one respective data element of annotated feedback is weighted between five and ten times that of the first annotated training dataset when retraining the deployed ML model $M_0$ instance to produce the second respective ML model $M_1$; and using the second respective ML model $M_1$, to classify utterances according to one or more sentiment classes.

2. The method of claim 1, wherein obtaining the at least one respective data element of annotated feedback is done interactively, via a user interface (UI) associated with the respective instantiation environment.

3. The method of claim 1, wherein the user determined classification of the at least one respective utterance comprises classification of the at least one respective utterance according to two or more sentiment classes.

4. The method of claim 1, further comprising:
receiving an annotated validation dataset, comprising a plurality of utterances, and computing a corresponding plurality of confidence scores, wherein each confidence score represents a certainty level of classification of an utterance to a sentiment class;
sorting the utterances of the validation dataset in an ordered list, according to the computed confidence scores;
for one or more entries of the ordered list, computing a value of classification precision;
identifying an index of the ordered list that corresponds to a required classification precision value; and
determining the confidence score of the identified index as a prediction threshold for classifying utterances as belonging to the sentiment class.

5. A method of finetuning automated sentiment classification by a computing system to handle new vocabularies introduced by domains of new deployments, the method comprising:
receiving a base ML model $M_0$, pretrained to perform automated sentiment classification of utterances, wherein the base model $M_0$ is associated with at least one prediction threshold;
deploying a respective instance of the base model $M_0$ to each of one or more respective instantiation environments;
for each deployed ML model $M_0$ instance:
receiving at least one respective utterance via a contact center application of the respective instantiation environment;
obtaining at least one respective data element of annotated feedback, wherein the at least one respective data element of annotated feedback corresponds to the at least one respective utterance and to a respective prediction, determined by the deployed ML model $M_0$, of a sentiment class of the at least one respective utterance and includes a user determined classification of the at least one respective utterance and a corresponding feedback type;
automatically calibrating the at least one prediction threshold according to a required level of precision for the respective instantiation environment to produce at least one calibrated prediction threshold, and based on the at least one respective data element of annotated feedback; and
using the at least one calibrated prediction threshold to classify utterances as belonging to one or more sentiment classes.

6. The method of claim 5 wherein obtaining the at least one respective data element of annotated feedback comprises:
presenting one or more utterances to a user, via a UI; and
obtaining the at least one respective data element of annotated feedback from the user via the UI, wherein the annotated feedback comprises classification of the presented one or more utterances according to two or more sentiment classes.

7. The method of claim 6, wherein presenting one or more utterances comprises:
calculating a plurality of confidence scores to a corresponding plurality of utterances, according to each utterance's pertinence to a sentiment class;
selecting a subset of utterances of the plurality of utterances for feedback based on their respective confidence scores; and
presenting the selected subset of utterances via the UI.

8. The method of claim 7, wherein selecting one or more utterances for feedback comprises, for each sentiment class:
selecting a first subset of utterances that surpass a selection threshold from the plurality of utterances; and
randomly selecting a second subset of utterances from the first subset; and
presenting the second subset of utterances via the UI.

9. The method of claim 8, wherein the prediction threshold is specific for each sentiment class.

10. The method of claim 8, wherein the size of the second subset of utterances is limited by a predefined subset size, that is specific for each sentiment class.

11. The method of claim 8, wherein the second subset of utterances comprises 300 utterances or less.

12. The method of claim 8, wherein calibrating the at least one prediction threshold comprises:
calculating one or more confidence scores, corresponding to the one or more utterances of the second subset, according to each utterance's pertinence to a sentiment class;
sorting the plurality of utterances of the second subset in a descending ordered list, according to the confidence scores;
for one or more entries of the ordered list, computing a value of classification precision based on the annotated feedback;
identifying an index of the ordered list that corresponds to a required classification precision value; and
determining the confidence score of the identified index as the value of the prediction threshold.

13. The method of claim 8, wherein the predefined subset size is selected so as to guarantee that the prediction threshold corresponds to ground truth precision having a confidence value of at least 95% within a margin of error of 0.05.

14. The method of claim 5, wherein the sentiment classes are selected from a list consisting of positive sentiments and negative sentiments.

15. A system for finetuning automated sentiment analysis to handle new vocabularies introduced by domains of new deployments, wherein said system is associated with a specific site and comprising: (a) a non-transitory memory device storing instruction code, and (b) a processor associated with the memory device, wherein the processor is configured to execute the instruction code so as to:
- receive a base ML model $M_0$, pretrained to perform automated sentiment classification of utterances, based on a first annotated training dataset;
- deploy an instance of the base ML model $M_0$ to an instantiation environment associated with the specific site;
- receive at least one utterance by the instantiation environment via the site;
- obtain at least one data element of annotated feedback, wherein the at least one data element of annotated feedback corresponds to the at least one utterance and to a prediction, determined by the deployed ML model $M_0$ instance, of a sentiment class of the at least one utterance and includes a user determined classification of the utterance and a corresponding feedback type;
- retrain the deployed ML model $M_0$ instance to produce a second ML model $M_1$ based on a second annotated training dataset, wherein the second annotated training dataset comprises the first annotated training dataset and the at least one data element of annotated feedback, wherein the at least one data element of annotated feedback is weighted between five and ten times that of the first annotated training dataset when retraining the deployed ML model $M_0$ instance to produce the second ML model $M_1$; and
- use the second ML model $M_1$ to classify utterances according to one or more sentiment classes.

16. The method of claim 1, wherein obtaining at least one respective data element of annotated feedback that includes a corresponding feedback type comprises obtaining at least one respective data element of annotated feedback that includes a corresponding feedback type indicative of a true positive, a true negative, a false positive, or a false negative.

* * * * *